April 3, 1951  S. E. GARUTSO  2,546,996
DEEP FOCUS LENS
Filed Sept. 4, 1946

STEPHEN E. GARUTSO
INVENTOR.

BY William R. Ballard
ATTORNEY.

Patented Apr. 3, 1951

2,546,996

UNITED STATES PATENT OFFICE 2,546,996

DEEP FOCUS LENS

Stephen E. Garutso, San Fernando, Calif., assignor to Garutso, Inc., a corporation of Delaware Application September 4, 1946, Serial No. 694,686

5 Claims. (Cl. 88—57)

This invention relates to lenses for optical purposes such as used in cameras or wherever great depth of focus and fidelity of image are important; and the purpose of the invention is to improve these qualities in such lenses. The invention constitutes an improvement in the type of lens disclosed in my earlier applications, Serial No. 581,382, filed March 7, 1945, now abandoned, and Serial No. 624,501, filed October 25, 1945.

I have discovered that the depth of focus of known lenses can be greatly increased by combining therewith annular balancing lens elements of smaller diameter than the conventional lens and eccentrically placed with respect thereto so as to overlie a surface of the latter principally outside its center area. The axes of the balancing elements will be generally parallel to but displaced laterally from the axis of the conventional lens. A plurality of such elements is preferably employed and they are preferably arranged symmetrically around the principal axis of the conventional lens although other arrangements may be used.

Figure 1:
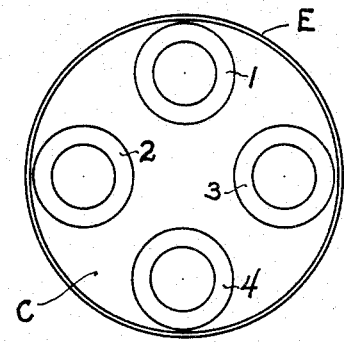
Figure 1 is a face view of an element of a conventional lens and an illustrative example of balancing elements overlying its surface.

In Figure 1, C indicates one of the elements of a known type of lens and 1, 2, 3 and 4 designate eccentrically placed balancing lens elements arranged in accordance with the present invention around the principal axis of the element C. This arrangement is, as shown, preferably (though not necessarily) symmetrical, and is such that the annular elements do not overlie the center area of the conventional lens as respects rays entering the lens parallel or nearly parallel to its principal axis. The annular elements may be supported in any convenient manner as by cementing to the surface of one of the conventional elements or by a fine wire frame.

Figure 2:
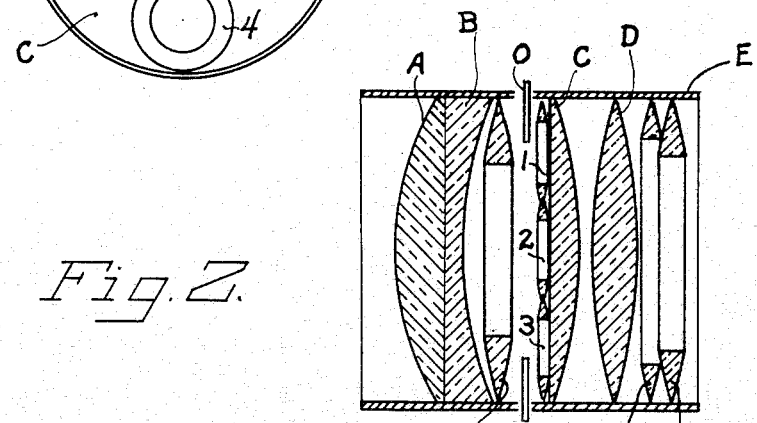
Figure 2 is a medial section of a complete lens showing one embodiment of the invention.

Figure 2 shows the invention applied to a known type of commercial lens to which have been added also in this case balancing elements 5, 6 and 7 in accordance with the disclosure of my earlier application Serial No. 624,501 above referred to. In this figure A, B, C and D represent the elements of the conventional lens and 5, 6 and 7 indicate annular balancing elements for improving the depth of focus in accordance with the principle of the said earlier application. The position and arrangement of the balancing elements provided in accordance with the present invention are indicated at 1, 2 and 3 (the fourth element not appearing in this view since it is a medial section).

Experiments show that the number of eccentrically arranged balancing elements and their spacing from one another may vary considerably without sacrificing the benefits of the invention. They may be used alone or in combination with the coaxial balancing elements as shown. All of the balancing elements are converging lenses and their refractive power may be varied depending upon the increased depth of focus required. The particular example of the invention represented in Figure 2 shows it applied to a commercial type of motion picture lens having a 6" focal length and a diameter of 48 mm., which is particularly useful also for television. When focused on nearby objects, this lens has a usable depth of focus of only a few inches. With balancing elements added as shown in Figure 2 it may be focused on 10 feet with a useful depth of focus up to as close as 5 feet, and if focused on optical infinity will give satisfactory focus for objects as close as 10 feet. In this instance the eccentric balancing elements each have an outside diameter of 16 mm. and an inside diameter of about 10 mm., and have a refractive power, expressed in dioptrics of plus 40. Each is spaced 7 or 8 millimeters from the principal axis of the conventional lens. The coaxial elements 5, 6 and 7 may have inside diameters of 27 mm., 36 mm. and 32 mm. respectively, and refractive powers of plus 10, plus 6 and plus 10 dioptrics respectively.

Figure 3:
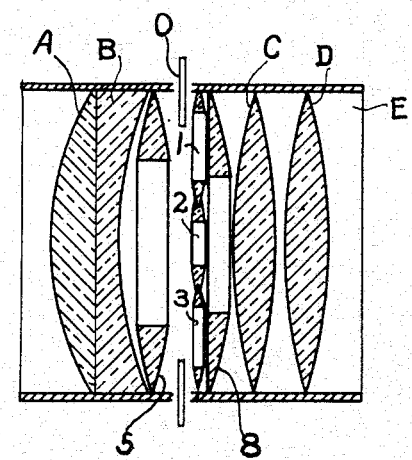
Figure 3 shows another embodiment of the invention.

In Figure 3, two concentric balancing elements, 5 and 8, are used and the eccentric balancing elements are mounted on the flat face of the planoconvex element 8.

If desired a number of sets of eccentrically located units or groups may be used displacing concentrical balancing elements in an assembly such as illustrated, and various other alternative arrangements obviously may be used without departing from the spirit of the invention as set forth in the appended claims.

What I claim as my invention and desire to secure by Letters Patent is:

1. A deep focus, photographic objective comprising in combination a conventional photographic objective having a plurality of axially spaced elements and a plurality of annular, light-converging, balancing elements positioned between elements of said conventional objective, said balancing elements having external diameters less than one-half of that of said conventional objective and having their optical axes substantially parallel to the axis of said conventional objective but displaced therefrom whereby said annular elements affect peripheral rays passing through said conventional objective while leaving relatively unaffected, a central zone thereof.

2. A deep focus photographic objective comprising in combination: a conventional photographic objective having a plurality of axially spaced elements, and a plurality of annular collecting lenses each having an external diameter less than one-half that of said conventional objective, said annular lenses being mounted against and in physical contact with a surface of one of the elements of said conventional objective with the peripheries of said annular elements substantially tangent to the periphery of said last-named conventional element.

3. The construction of claim 2 further characterized in that said annular lenses are cemented to said surface.

4. The construction of claim 2 further characterized in that said surface is a plane.

5. In combination in a multiple element photographic objective of the type having a lens element with one plane surface: a plurality of positive annular lenses having external diameters substantially one-half that of said element mounted in physical contact with said surface with the optical axis of said annular lenses parallel to, but displaced from that of said objective.

STEPHEN E. GARUTSO.

REFERENCES CITED

The following references are of record in the file of this patent:

UNITED STATES PATENTS

| Number | Name | Date |
| --- | --- | --- |
| 1,154,232 | Byron | Sept. 21, 1915 |
| 1,169,731 | Mengel | Jan. 25, 1916 |
| 1,627,892 | Frederick | May 10, 1927 |
| 1,979,159 | Howser | Oct. 30, 1934 |
| 2,004,806 | Ellestad | June 11, 1935 |

FOREIGN PATENTS

| Number | Country | Date |
| --- | --- | --- |
| 395 | Great Britain | of 1900 |
| 193,969 | Great Britain | Mar. 2, 1923 |
| 335,696 | Great Britain | Oct. 2, 1930 |
| 373,755 | Germany | Apr. 16, 1923 |